United States Patent

[11] 3,542,319

[72] Inventors James W. Duncan
 Arden;
 Fred B. Stencel, Asheville, North Carolina
[21] Appl. No. 708,702
[22] Filed Feb. 27, 1968
[45] Patented Nov. 24, 1970
[73] Assignee Stencel Aero Engineering Corporation
 Arden, North Carolina
 a corporation of North Carolina

[54] ADJUSTABLE EJECTION SEAT WITH CANOPY BREAKERS
 19 Claims, 8 Drawing Figs.
[52] U.S. Cl. .................................................. 244/122, 244/141
[51] Int. Cl. .................................................. B64d 25/10
[50] Field of Search ........................................... 244/122, 141

[56] References Cited
UNITED STATES PATENTS

| | | | |
|---|---|---|---|
| 2,304,781 | 12/1942 | Dillon | 244/1 |
| 2,331,309 | 10/1943 | Curriston | 244/122 |
| 2,467,763 | 4/1949 | Martin | 244/122 |
| 2,707,086 | 4/1955 | Kennard | 244/122 |
| 3,079,112 | 2/1963 | Campbell et al. | 244/122 |
| 3,130,947 | 4/1964 | Franks | 244/122 |
| 3,152,781 | 10/1964 | Martin | 244/122 |

Primary Examiner—Duane A. Reger
Assistant Examiner—James E. Pittenger
Attorney—Roylance, Abrams, Kruger, Berdo & Kaul ABSTRACT: An ejection seat for use in aircraft wherein a catapult system is used for propelling the seat upwardly out of the aircraft when the catapults are actuated. The catapults are attached to the back of the seat by means of a sleeve concentrically surrounding a portion of the catapult tube, and along this portion of the tube, a piston means is formed. Thus, by controlling the introduction of fluid pressure into the sleeve to react against the piston portion of the catapult tube, the seat can be selectively adjusted in height so that the occupant's eyeline will be at a proper level. By limiting the pressure which can be contained in the upper part of the sleeve, it is possible to restrict to a predetermined value, the maximum downward force which can be exerted on the seat. When this predetermined value is exceeded, the seat will adjust downward at a controlled rate thereby limiting downward acceleration on the seat occupant to a physiologically tolerable level and thus lessening the possible injuries which could be inflicted upon the occupant in the event of a crash.

The catapults themselves include telescoping inner and outer tube members which are normally locked together adjacent the upper end thereof, and additionally, a canopy breaker is provided at the upper end of each set of catapult tubes. When the catapults are actuated or energized, the fluid pressure therein serves to unlock the inner and outer catapult tubes to permit the same to telescope relative to one another, and additionally, such pressure energizes the canopy breaker to drive the same upward for shattering the canopy.

Patented Nov. 24, 1970

INVENTORS,
JAMES W. DUNCAN
FRED B. STENCEL

BY Arnold, Roylance, Kruger & Durkee

ATTORNEYS.

FIG. 3

INVENTORS.
JAMES W. DUNCAN
FRED B. STENCEL

BY Arnold, Roylance, Kruger & Durkee
ATTORNEYS.

Patented Nov. 24, 1970

INVENTORS.
JAMES W. DUNCAN
FRED B. STENCEL

BY Arnold, Roylance, Kruger &
Durkee
ATTORNEYS.

3,542,319

ADJUSTABLE EJECTION SEAT WITH CANOPY BREAKERS

This invention relates to an aircraft ejection seat and more particularly it relates to a vertically adjustable ejection seat having canopy breaker means associated therewith for shattering the canopy prior to the time that the seat reaches the canopy during an ejection operation.

It has become conventional practice to provide ejection seats in many types of aircraft, particularly military aircraft, so that in the event of an emergency, the occupant can rapidly operate the ejection controls, thereby promptly propelling the seat upwardly out of the aircraft and permitting the occupant to thereafter parachute to safety. One consideration with respect to ejection seats of this type is the manner in which the canopy of the aircraft is removed prior to ejection. Since the ejection seat will ordinarily be located in the cockpit of an aircraft which is covered by a canopy, fabricated of some suitable transparent material, it is apparent that some means must be provided for removing the canopy to permit the seat, with the occupant therein, to be ejected. There have in the past been certain proposals advanced for accomplishing removal of the canopy but such proposals have not proved to be entirely satisfactory. One such proposal involves raising the forward edge of the canopy prior to seat ejection so that the air pressure would enter under the canopy and rip the same from the aircraft. Another somewhat different proposal involves a fluid-operated form of latch release device for unlocking the latches on the canopy so that the same would be pulled away by air pressure. The difficulty with both these proposals was that a certain time delay was encountered while the canopy was removed, and such delay could have disastrous results, particularly if ejection had to be accomplished at extremely low altitudes, such as during takeoff or landing. Still another proposal involves forcing the ejection seat itself through the canopy, with adequate seat structure being provided to assure that the seat contacts the canopy before the occupant's head reaches canopy level. Nevertheless, this proposal still inflicts highly dangerous and frequently injurious acceleration reversals upon the occupant. Another somewhat different approach involved the use of explosively actuated devices for either explosively unlatching the canopy from the aircraft or for explosively operating a movable breaker member which could shatter the canopy. This proposal, however, necessarily involved the provision of separate explosive charge means and mechanism for energizing the same and thus the overall ejection assembly was increased in cost, weight and system complexity, the latter of which markedly affects the degree of maintainability of the system.

Another consideration in connection with aircraft ejection seats is that the aircraft themselves are designed for a certain pilot eyeline level. Due to the variations in height of the possible seat occupants, it has thus been recognized that a certain amount of vertical adjustment must be provided which enables the seat to be raised when the occupant is relatively short or lowered when the occupant is relatively tall. Initial approaches for accomplishing this adjustability in height involved the provision of a series of vertically spaced apertures, commonly provided along the catapult tubes, and releasable pin or projection means which could be inserted into such apertures. One difficulty with this type of arrangement was that adjustment could only be provided by increments with the size of the increments being determined by the spacing between the adjacent apertures. Another difficulty with this type of arrangement was the fact that the constant vibration and shock forces present in the airplane tended to shorten the life of the adjustment arrangement and render the same less reliable. Another and more recent form of seat adjustment mechanism was electrical screwjacks which did at least provide an infinitely variable vertical adjustment rather than an incremental adjustment as was provided by the pin and aperture arrangement. However, once again the provision of these electrical screwjacks increased both the cost and the weight of the ejection seat assembly. A serious deficiency in both adjustment means is that they rigidly fix the seat height relative to the aircraft, and thus in the event of a crash, they transmit the crash acceleration to the occupant of the seat.

In view of the foregoing, it is, therefore, an object of the present invention to provide an ejection seat assembly which is adjustable and which incorporates canopy breakers, but which overcomes the difficulties and deficiencies associated with prior-art arrangements of this general type.

Another object of the present invention is to provide an ejection seat assembly wherein a catapult means is provided for ejecting the seat from the aircraft and wherein an adjustment mechanism and a canopy breaker means are integrated with the catapult means.

Another object of the present invention is to provide an aircraft ejection seat including an improved form of vertical adjustment mechanism which is relatively simple in construction and which does not materially increase the weight of the overall ejection seat assembly and which limits the acceleration which can be transmitted from the aircraft to the seat occupant for a finite length of time.

Another object of the present invention is to provide an aircraft seat which is ejectable through operation of a catapult means and wherein a canopy breaker means is associated with the catapult and is operative responsively thereto for shattering the canopy after the ejection sequence has commenced.

Other objects, advantages, and salient features of the present invention will become apparent from the following detailed description which, when taken in conjunction with the annexed drawings, discloses a preferred embodiment thereof.

Referring to the drawings which form a part of this specification.

Figure 1:
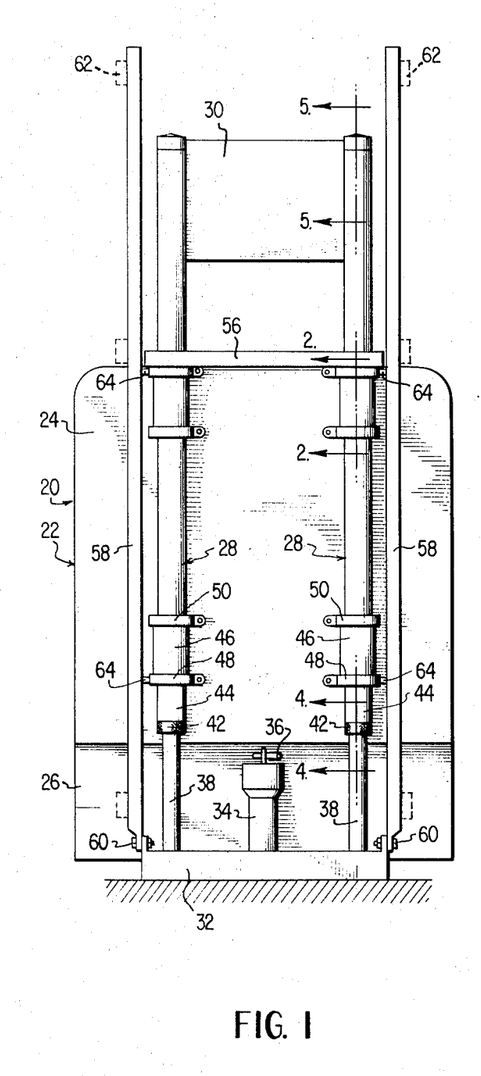
FIG. 1 is a rear elevational view of an aircraft ejection seat assembly in accordance with the principles of the present invention.

Referring now to the drawings in further detail, there is shown in FIG. 1 an ejection seat assembly in accordance with the principles of the present invention, such assembly being generally designated 20. The assembly includes an ejection seat generally designated 22 having an upstanding seat back 24 and a forwardly extending seat pan or bucket 26 disposed at the bottom of the back. If desired, a suitable form of survival kit may be housed beneath or within the seat pan 26.

A pair of catapult assemblies, each generally designated 28, extend upwardly along the back of the ejection seat 22, and in the form shown in FIG. 1, two such catapult assemblies 28 are provided in symmetrical disposition along the back of the seat. As can be noted, the catapult assemblies 28 extend considerably above the top of the seat back 24 and a headrest 30 is connected across the upper end of these catapult assemblies.

At their lower ends, the catapults 28 connect with a transverse header or manifold 32 which abuts against, and can be connected with, the structural supportive member on which the seat 22 is installed. An upstanding central cylindrical portion 34 on the header contains an explosive charge or cartridge which can be activated by withdrawal of a sear 36.

Since explosive cartridges of this type are conventional for actuation of ejection seats, as is the means for withdrawing the sear 36 to fire the cartridge, there is no need to describe the same in any detail herein. It should, however, be noted that the portion 34 is disposed centrally of the manifold 32 so that it can exert an equal pressure through the transversely extending passage in the header 32 which connects with the upstanding catapult assemblies 28 at either end therefrom.

Figure 4:
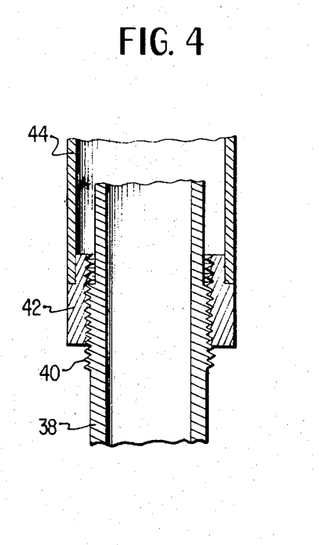
FIG. 4 is a fragmentary sectional view taken substantially along the line 4-4 of FIG. 1.

Each catapult assembly 28 includes an elongated upstanding inner hollow tube 38, the lower end of which is coupled with the header 32 so that the bore of the tube 38 communicates with the transverse bore in the header 32. In this manner, the pressures generated by the cartridge portion 34 can be transmitted equally into each of the two upstanding inner tubes 38. As shown in FIG. 1, and more clearly in FIG. 4, the inner tube 38 is provided with a series of external threads 40 disposed a short distance above the header 32 and these threads serve to receive an adjustment nut 42 which, in turn, supports an axially elongated outer catapult tube 44. Once the inner and outer tubes of each catapult assembly 28 are assembled, the adjustment nut 42 can be tightened until any play between these tubes is eliminated. The inner and outer tubes 38 and 44, respectively, serve to provide a telescoping tube arrangement wherein the outer tubes 44 are attached to the seat in a manner to be described in detail hereinafter, and the inner tubes 38, as aforementioned, are attached to the header 32 which remains fixed in the aircraft. Each inner tube and its associated outer tube are initially locked together by a locking means to be described in detail hereinafter, but such locking means is releasable under the pressure forces which are applied when the cartridge in a cylindrical portion 34 is fired. These pressure forces serve to propel the seat 22 and the outer tubes 44 attached thereto upwardly and out of the aircraft while the inner tubes 38 and the header 32 which they are attached remain installed in the aircraft.

Figure 2:
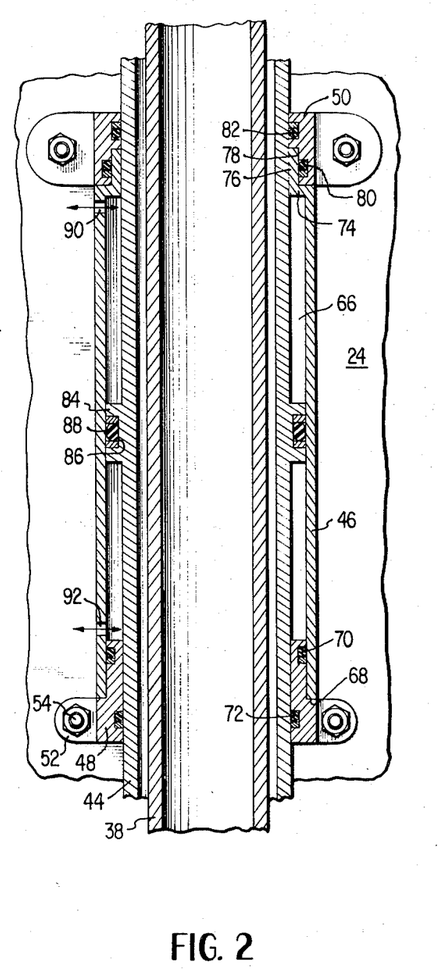
FIG. 2 is a fragmentary sectional view taken substantially along line 2-2 of FIG. 1.

For an understanding of how the catapult assemblies 28 or more particularly, the outer tubes 44 thereof, are attached to the back 24 of the ejection seat 22, it will be noted from FIG. 1, and more clearly from FIG. 2, that the outer tubes project upwardly through four cylindrical sleeves 46, each of which has a lower end cap 48 and an upper end cap 50. Each end cap is provided with a pair of flanges 52 which project outwardly so that a nut and bolt arrangement 54 can attach between the flanges and the seat back 24. It will be noted that two of the cylindrical sleeves 46 and their mounting means are provided near the bottom of the seat back 24 while another two such cylindrical sleeves are provided adjacent the top edge of the seat back 24. A bridge member 56 extends between the two catapult assemblies 28 just above the outer edge of the seat back and this bridge member abuts against the two uppermost end members 50 to strengthen the overall assembly and to assure that the catapults will remain in properly spaced relationship. In order to guide the seat 22 during its ejection, a pair of upstanding guide rails 58 are provided, each such guide rail having its lower end attached by bolts 60 to a flange at the end of the header 32. Thus, it will be apparent that the guide rails 58 will remain fixed in the aircraft due to their attachment to the header 32, but additionally, suitable external mounting blocks can be attached to the outer edges of the guide rails and to the bulkhead of the aircraft for maintaining the rails in proper position. On the inside surface of the guide rails 58, namely, that surface confronting each catapult tube assembly 28, a continuous groove of a prescribed shape is provided and bearing blocks or pillow blocks 64 can slide along within such grooves to guide the seat 22 during its ejection path. As shown in FIG. 1, one of these pillow blocks 64 extends laterally outward from each of the lowest end cap members 48 to mate within the groove in the rails 58 and a similar pillow block member extends laterally outward from the two uppermost end caps 50 for the same purpose. As aforementioned, the ejection rails 58 remain fixed in the aircraft but the seat with the cylindrical sleeves 46 and their end caps which are attached to the seat back by nuts and bolts 54 move upwardly to escape from the aircraft during ejection. Thus, as ejection occurs, the pillow blocks 64 will slide upwardly within the groove of the rails 58, thus guiding the initial trajectory of the seat 22. The positioning of the mounting block members 62 which mount the seat rails 58 to the bulkhead can be selected so that rails themselves space the header 32 slightly above the floor of the cockpit. In this manner, the entire seat assembly 22 would be suspended by the ejection rails 58 and thus the weight of the seat and the occupant would not be transmitted directly onto the floor of the cockpit of the aircraft. This type of mounting arrangement can be particularly useful in some aircraft which do not have a structural floor strong enough to support the combined weight of the ejection seat and its occupant.

While the sleeve members 46 serve the function of attaching the catapult assemblies 28 to the seat back 24, these cylindrical sleeves 46 can and do serve other functions as well. If desired, the outer catapult tube can be provided with ports or openings, not illustrated, which are disposed within the lowermost pair of cylindrical sleeves 46. These ports could be used for directing the catapult gases, which will escape from between the inner and outer tubes of the catapult during the end of the telescoping operation, to provide any desired form of "sequencing" operation. For example, the gases escaping through these ports could be used to operate ignition elements in auxiliary rockets, should such rockets be provided on the seat assembly. Also, such gases could be used for operating automatic lap belt-opening devices, for operating delay devices when multiple seats are to be ejected, so that one seat will not eject until shortly after the other one starts to eject, and so on.

The two uppermost cylindrical sleeves 46 are utilized for accomplishing the aforementioned vertical adjustment of the seat 22. This vertical adjustment feature of the present invention will become more apparent by reference to FIGS. 2 and 3 hereof wherein it can be seen that the outer catapult tube 44 passes through the cylindrical sleeve 46 and its end members, thereby forming an annular space or recess 66 between the exterior of the tube 44 and the interior of the sleeve or cylinder 46. The lowermost end cap 48 is provided with an outwardly directed shoulder 68 upon which the lower end of the cylindrical sleeve 46 abuts. A first O-ring and sealing ring assembly 70 is provided between the exterior of the end cap and the inside of the cylindrical sleeve 46 and a second O-ring and sealing ring assembly 72 is provided along the interior bore of the end cap 48 to seal against the exterior surface of the catapult tube 44. At the upper end cap 50, the cylindrical sleeve 46 is provided with an inwardly directed shoulder 74 which abuts against the underside of the end cap 50, such shoulder then merging into an axially extending reduced diameter portion 76 of the sleeve which closely surrounds the catapult tube 44. This reduced diameter portion 76 fits within a downwardly opening annular recess 78 in the end cap 50 and an O-ring and sealing ring assembly 80 is provided in the recess to seal against the exterior of the portion 76. A similar O-ring and sealing ring assembly 82 is provided in the end cap 50 above the recess 78 thereof to seal against the exterior surface of the catapult tube 44.

Within the sleeve 46, the outer catapult tube 44 is provided with an integral outwardly directed flange portion which serves to provide a piston 84 slidable along the interior surface of the cylindrical sleeve 46. The outer periphery of the piston 84 is provided with a recess 86 which mounts an O-ring and sealing ring assembly 88 which tightly seals against the inner surface of the sleeve 46 to prevent fluid communication between the annular recess portions 66 on opposite sides of the piston. A pair of fluid ports 90 and 92 communicate with the annular recess 66 on opposite sides of the piston 84, and while in the embodiment of FIG. 2, these ports 90 and 92 have been shown as passing through the sleeve 46 at the opposite ends thereof, adjacent the end caps 48 and 50, such showing has been simplified somewhat for illustrative purposes. In actual practice, the ports 90 and 92 can be formed through the end caps themselves to communicate with opposite ends of the annular recess 66. At any rate, it will be apparent that when the ports 90 and 92 have been connected in a fluid circuit so that fluid can be introduced into the annular recess 66 on opposite sides of the piston 84, then if the pressure flow through the port 90 is increased, the volume of the recess 66 above the piston is increased, and the volume beneath the piston is decreased by expelling the fluid through the port 92. Conversely, if the fluid pressure through the port 92 is increased, the volume thereabove is decreased by expelling the fluid through the port 90.

Figure 3:
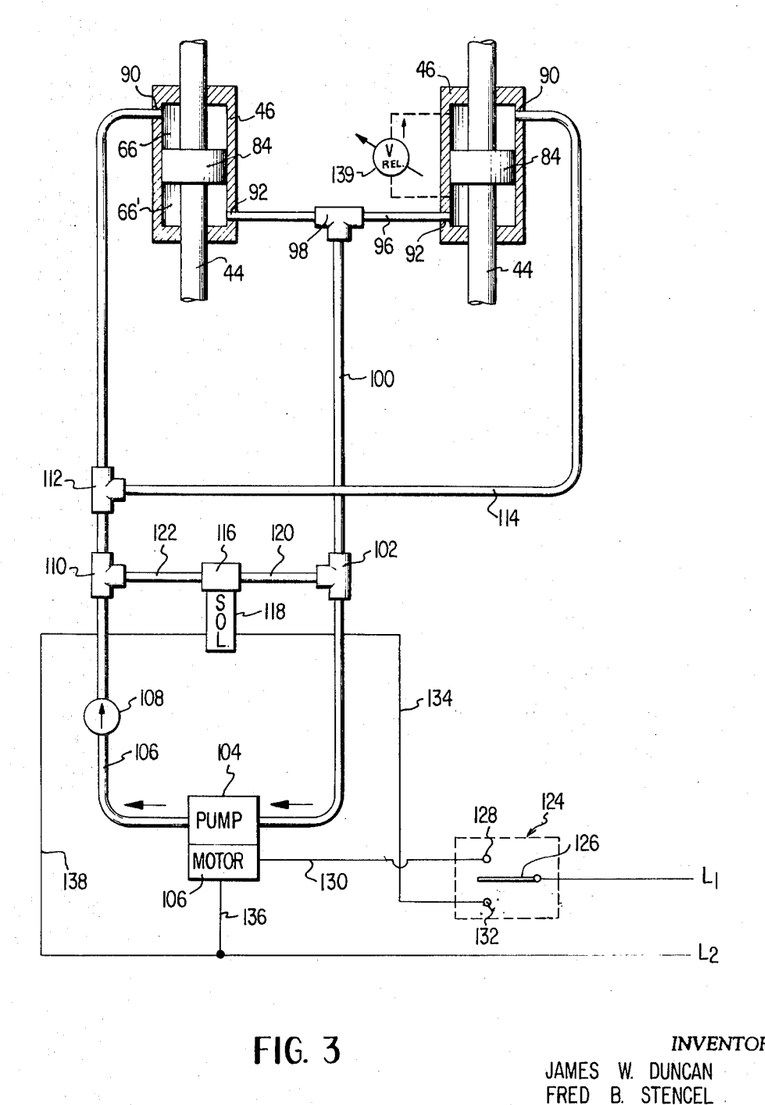
FIG. 3 is a schematic hydraulic and electrical circuit utilized for vertically adjusting the ejection seat.

If reference is now made to FIG. 3, a suitable hydraulic and electric schematic diagram is shown therein, and while this diagram has been omitted from the illustration of FIG. 1 for simplicity, it will be understood that in actual practice, the entire hydraulic and electrical circuit is carried on the ejection seat 22, with the hydraulic circuit being connected along the back 24 thereof. In the diagram of FIG. 3, the annular recess portion above the piston 84 still remains designated 66, but the annular portion beneath the piston 84 has been designated 66'. A first hydraulic line 96 connects the ports 92 which communicate with the annular recess portions 66'. This line 96 carries a fitting 98 so that the flow from both ports 92 can be directed through a single line 100, passed around fitting 102 to a pump 104 which is driven by an electric motor 106. The pump 104 is a unidirectional pump which pumps in the direction of the arrows shown in FIG. 3 and hence fluid supply through the line 100 to pump 104 is discharged under pressure from the pump through a line 106 carrying a check valve 108, and a pair of fittings 110 and 112, and which connects to one of the ports 90 communicating with the annular recess portions 66.

Another hydraulic line 114 extends from the fitting 112 to the port 90 on the other cylindrical part 46. Additionally, a solenoid-controlled valve 116 having a control solenoid 118 is interposed between the fittings 102 and 110 and is connected with the former by a flow line 120 and with the latter with a flow line 122. Any type of fluid can be used in the hydraulic circuit of FIG. 3, but one advantageous type of fluid is a silicone fluid which is nonevaporative and hence will not form a nuisance film which could obscure vision through the transparent canopy should the system develop a leak within an unpressurized cabin. Considering the electrical portion of the circuit of FIG. 3, it will be seen that a three-position switch, generally designated 124 is provided, such switch customarily being mounted on some accessible portion of the ejection seat assembly 22. The movable switch element 126, connected to an electrical lead line $L_1$ ordinarily assumes a neutral or "off" position. When the switch 126 is moved up it contacts a terminal 128 connected by a lead 130 to the motor 106 which drives the pump. When the switch 126 is moved down, it contacts a terminal 132 connected by a lead line 134 to the solenoid 118 which operates the valve 116. The other electrical lead line $L_2$ connects by a lead 136 to the motor 106 and by a lead 138 to the solenoid 118. The power lines $L_1$ and $L_2$ can be connected to the aircraft onboard power supply or to some suitable auxiliary power supply.

To understand the operation of the circuit of FIG. 3 and hence the manner in which the seat is vertically adjusted, it will be understood that the hydraulic circuit is ordinarily completely filled with suitable hydraulic fluid and that the switch 126 is ordinarily in its neutral position at which time the valve 116 is closed. When the occupant enters the seat 22, the weight of the seat plus the occupant increases the pressure upon the fluid in the annular recess portion 66. In other words, the pistons 84 remained fixed in position but the weight of the seat and occupant act downwardly, thus tending to move the upper end caps 50 downwardly toward the pistons 84 and thereby pressurizing the fluid between the top of the piston and the bottom of the end cap 50. This increased pressure is transmitted along the line 106 as far as the check valve 108. It is also transmitted along the line 114 and through the fitting 112 to merge with the pressure in the line 106. Finally, it is transmitted through the branch line 122 to the closed solenoid control valve 116. If the seat is in in the proper position once the occupant enters the same, he need make no adjustment and the seat will remain fixed in position with the pressure forces being as just described. If the seat is too high and the occupant desires to lower the same, he moves the switch element 126 to a "down" position, thereby contacting the switch element against the terminal 132. In this "down" position, the switch actuates the solenoid 118 to open the valve 116 so that the pressurized fluid can pass the valve 116 and flow through the line 120 and into the line 100. So long as the occupant holds the switch 126 in its "down" position, the seat will continue to lower and when the same has reached its desired position, the occupant releases the switch which thereafter returns to its neutral position as shown in FIG. 3. At this time, vertical lowering of the seat is complete and the seat has reached its new adjusted lower position. On the other hand, when the occupant enters the seat and finds that the same is too low, he moves the movable switch element 126 to its "up" position in contact with the terminal 128, thereby setting the motor 106 into operation. This causes the pump 104 to draw the pressurized fluid from the portions 66' and to pump the same through the line 106 and past the check valve 108. Since the solenoid valve 116 will be closed at this time, the pump fluid will flow through the line 106 and the line 114 to enter the annular portion 66 above the piston, thus increasing the volume of this portion by raising the cylindrical sleeve which is attached to the seat. Once again, when the seat has reached its adjusted upper position, the occupant can release the movable switch element 126 and it will once again return to its neutral position as shown in FIG. 3.

As aforementioned, it is desirable to provide means for limiting the downward acceleration which can be transmitted to the occupant of the seat. In this manner, once the downward acceleration reaches a predetermined design value, the seat can be lowered at a controlled rate to diminish the forces on the occupant to a physiologically acceptable or tolerable level. This downward acceleration limiting means can prove valuable in an instance such as an aircraft crash to prevent the crash forces from being directly transmitted from the aircraft through the seat to the occupant therein. One simple means for providing this downward acceleration limiting means is by way of a rupturable membrane which will burst when the fluid pressure exceeds a predetermined amount. Such a membrane can be provided in a bypass between the upper and lower recess portions 66 and 66'. Alternatively, such a membrane could be provided in the solenoid valve element 116, but in either instance, bursting of the membrane permits bypass fluid flow with the fluid in the lower recess portion of the sleeve acting as shock absorber. In the burstable membrane type of arrangement just described, the orifice size or area formed by bursting would be relatively constant and hence the fluid pressure would be dependent upon the acceleration forces. However, to provide a more accurate and constant means for limiting the acceleration level, the area of the orifice should be variable and this can be accomplished, for example, by providing a variable pressure relief valve 139 in a bypass line between the upper and lower recess portions 66 and 66'. One such pressure relief valve 139 is shown in FIG. 3 and it will be understood that such valve is ordinarily closed. However, when the downward acceleration pressure increases to a certain level, as could be encountered in an aircraft dive or spin, the valve 139 opens to a first orifice size. For a sharper pressure increase, as could be encountered in an aircraft crash, the valve 139 opens to a larger orifice size.

It was previously mentioned that the inner and outer catapult tubes 38 and 44 were initially locked together, but that upon actuation, such tubes unlocked to permit telescoping movement. Additionally, actuation of the catapults serves to responsively operate canopy breaker means for shattering the canopy overlying the ejection seat 22. For a further description of this arrangement, attention is directed to FIG. 5 wherein it can be seen that the outer catapult tube 44 continues upward and terminates in an integral upper-end portion 140 having an internal bore with screw threads 142. A sleeve member 144 is disposed interiorly of the end portion 140 in the upper end of the outer catapult tube 44, with the sleeve member having a flat upper surface 146 and a series of external screw threads 148 depending downwardly from this upper surface to engage with the internal screw threads 142 of the end portion 140. In this manner, the sleeve member 144 is threaded into position to be supported by and fixed with respect to the end portion 140 of the catapult tube 44. Externally, the sleeve member 144 has a downwardly and outwardly directed frustoconical shoulder 150 beneath the screw threads 148, such shoulder merging into a cylindrical portion 152 whose diameter is somewhat less than the inside diameter of the outer catapult tube 44. Continuing downwardly, the reduced diameter portion 152 merges into an outwardly directed flat shoulder 154 extending outwardly to the inner surface of the catapult tube 44, and thereafter, the sleeve member has a downwardly directed skirt portion 156 extending along the walls of the catapult tube 44 and terminating in the lower end face 158.

Internally of the sleeve member 144, a first small bore portion 160 extends axially downward from the top face 146 of the sleeve member to join with an intermediate bore portion 162 therebeneath. When the bore portion 160 meets the bore portion 162, an outwardly directed shoulder 164 is provided. The intermediate bore portion 162, in turn, merges into a larger internal bore portion 166 with a shoulder 168 being provided at the juncture between these bore portions. The bore portion 166 merges into a small downwardly and outwardly directed frustoconical shoulder 170, which, in turn, merges into an outwardly directed shoulder 172 forming the upper surface of a still larger bore portion 174 which projects downwardly to the bottom face 158 of the sleeve member. A continuous annular locking groove 176 is provided along the bore 174 between the shoulder 172 and the lower end 158 of the sleeve, and by referring to FIG. 8, it can be seen that the groove 176 includes a flat central portion and a pair of opposed frustoconical-sloped shoulder portions.

The portion of the outer catapult tube 44 opposite the portion 152 of the sleeve contains a recess 178, preferably of a rectangular configuration, so that a sealing ring 180 can be positioned therein to serve as a seal between the interior of the catapult tube 44 and the cylindrical portion 152 of the sleeve. Additionally, the skirt 156 of the sleeve member 144 includes an annular recess 182 having a sealing O-ring 184 positioned therein for sealing against the inner surface of the outer catapult tube 44.

Figure 5:
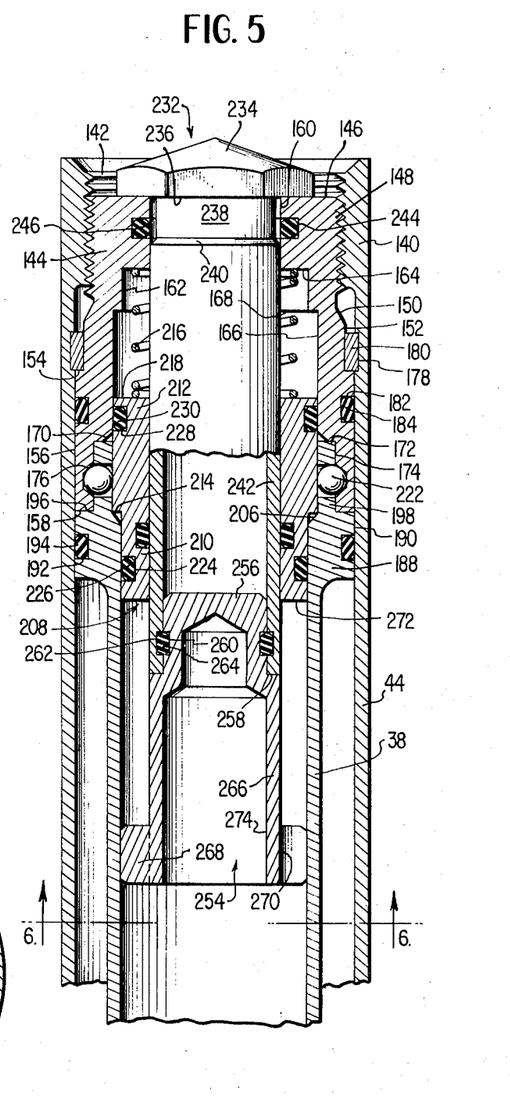
FIG. 5 is a fragmentary sectional view taken substantially along the line 5-5 of FIG. 1, showing the catapult tubes in locked position and the canopy breaker in its normal position.

The upper end of the inner catapult tube 38 is formed as a piston 188 having an outer surface 190 engageable against the inner surface of the outer catapult tube 44. An annular recess 192 is provided along the surface 190 for mounting a sealing O-ring 194 which presses against the inner surface of the outer catapult tube 44. The piston 188 is provided with an inwardly stepped shoulder 196 adapted for abutting against the under side 158 of the sleeve member 144, as shown in FIG. 5. The piston likewise includes an upstanding annular rib 198 having an outer surface 200 of a diameter of the bore portion 174 in the sleeve member. The rib 198 terminates in an upper edge 202 which abuts against the shoulder 172 on the sleeve member 144. The inner diameter 204 of the rib is slightly greater than the inner diameter of the tube 38 and these two diametral portions are joined together by a small frustoconical inwardly and downwardly tapering shoulder 206, as can best be seen in FIG. 8.

Figures 7, 8:
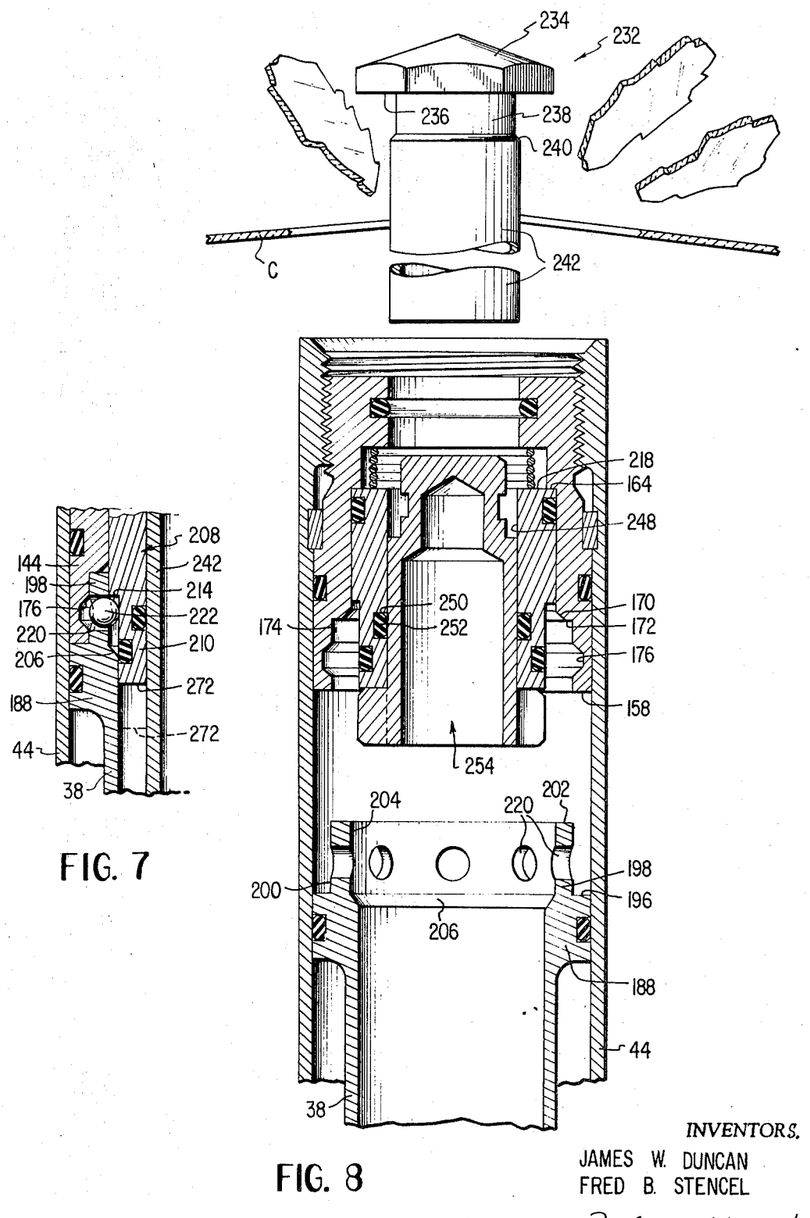
FIG. 7 is a fragmentary sectional view of the catapult tubes shown in FIG. 5, as the same start to unlock.
FIG. 8 is a fragmentary sectional view of the assembly of FIG. 5 after the catapult tubes have been unlocked from one another and after the canopy breaker has been propelled upwardly to shatter the canopy.

A lock member generally designated 208 is formed with a lower cylindrical portion 210 having an outer diameter substantially equal to the inner diameter of the tube 38 and an upper cylindrical portion 212 having an outer diameter substantially equal to the diameter of the bore portion 166 of the sleeve member, which corresponds with the diameter of the wall 204 defining the inner surface of the rib 198. A small radially extending shoulder 214 is formed where the portions 210 and 212 of the lock members merge with one another, and when the lock member is in the position shown in FIG. 5, the outer edge of this shoulder 214 abuts against the top of the frustoconical shoulder 206 on the inner catapult tube 38. A compression spring 216 positioned within the bore portions 162 and 166 of the sleeve member reacts between the shoulder 164 on the sleeve member and the top surface 218 of the lock element 208. Thus, the spring 216 normally serves to urge the lock element to the position shown in FIG. 5. The rib 198 at the top of the piston 188 is provided with a series of spaced apertures 220, as shown in FIG. 8, such apertures normally being alined with the locking groove 176 in the sleeve member 144, when the parts are in the position shown in FIG. 5. A series of spherical locking balls 222 can be inserted through these holes and when the lock element 208 is biased downwardly as shown in FIG. 5, the balls 222 are disposed both within the locking groove 176 and within the apertures 220. As a result, the balls serve to maintain the piston 188, forming a part of the inner tube 38, locked with the sleeve element 144 which is physically attached to the outer catapult tube 44. In other words, when the lock element 208 is in its normally biased position of FIG. 5, the locking balls 222 and the cooperating locking groove 176 serves to lock the inner and outer catapult tubes, 38 and 44, respectively, with one another. It can be noted that the lower portion 210 of the lock element is provided with an annular groove 224 carrying a sealing O-ring 226 which seals against the inner surface of the catapult tube 38. Similarly, the upper portion 212 of the lock element is provided with an annular recess 228 carrying a sealing O-ring 230 which seals against the walls of the bore portion 166 in the sleeve member 144.

A canopy breaker element generally designated 232 is provided in the upper end of the catapult assembly, such breaker element, in the illustrated embodiment, including a head having a conical top surface 234 and a generally flat under surface 236. As shown in FIG. 5 and also in FIG. 8, a reduced diameter shank portion 238 depends from the under surface 236 of the breaker and merges by a frustoconical shoulder 240 into a slightly larger elongated cylindrical shank portion 242. The upper bore portion 160 of the sleeve member 144 is provided with an annular recess 244 which carries a circular O-ring 246 which contacts against the shank portion 238 of the breaker to act as a both a dust seal and a breaker retainer member. The elongated portion 244 formed interiorly of the lock element 208. An annular recess or channel 250 is provided along the bore 248 for carrying a sealing O-ring 252 which normally seals against the exterior of the breaker shank 242.

Figure 6:
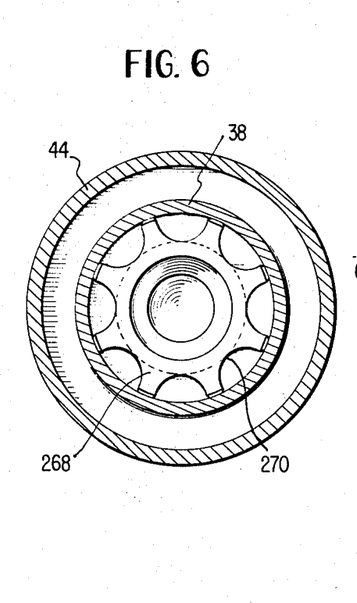
FIG. 6 is an elevational view along the line 6-6 of FIG. 5.

A plug member generally designated 254 is provided beneath the breaker member 232, such plug member including a head portion 256 which fits within the open lower end of the breaker shank 244 and an outwardly directed shoulder 258 against which the bottom edge of the breaker shank 242 abuts. An annular groove 260 is formed along the periphery of the plug head portion 256 and a similar and confronting annular groove 262 is provided interiorly of the shank portion 242 of the breaker, as shown in FIG. 5. O-ring seal 264 fits between the grooves 260 and 262 and thus serves to releasably lock the plug member and the breaker member together. The plug member also includes a shank portion 266 depending from the head portion 256 internally of the inner catapult tube 38 and the plug member terminates in an enlarged base portion 268 having a diameter substantially equivalent to the inner diameter of the tube 38 so that the plug member 254 is guided during its sliding movement within the catapult tube. As can best be seen in FIG. 6, a series of semicylindrical openings 270 are provided through the base portion 268 so that gases flowing through the inner catapult tube 38 can pass through the openings 270 to contact against the under surface 272 of the lock element 208. The plug element 254 is provided with an internal cavity 274 which functions to reduce the weight of the plug member, although from an operational standpoint, the cavity 274 does not serve any function which would not be equally well provided by making the plug member imperforate, except for the grooves 270 passing through the base thereof.

Considering now the operation of the catapults and canopy breaker, it will be understood that, as aforementioned, such operation is initiated by withdrawing the sear 36 to activate the explosive cartridge in the portion 34 of the header or manifold 32. The pressure forces created by this explosion are transmitted through the header and simultaneously up the two inner catapult tubes 38. These gases traveling up the inner catapult tubes 38 enter the cavity 274 in the plug member 254 and serve to force the same upwardly. Simultaneously, these gases pass through the openings 270 in the base of the plug member and contact the under side 272 of the lock element 208 serving to move the same upwardly against the biasing force of the spring 216. FIG. 7 illustrates the lock element 208 moved upward for a short distance from its initial position, and, as aforementioned, such upward movement against the biasing force of the spring is accomplished by the gas pressures within the inner catapult tube 38. In FIG. 7, the shoulder 214 on the lock element has raised to a level above the apertures 220 in the rib 198 so that the balls 222 are able to move inwardly toward the reduced diameter portion 210 of the lock element. Once the balls do move inwardly, as shown at FIG. 7, they will be effectively "unlocked" from the locking groove 176 in the sleeve member 144, and at this point, the inner and outer catapult tubes will be unlocked from one another.

As the gas forces continue in the inner catapult tube, the lock element 208 will be driven upwardly until the top surface 218 thereof seats upon the shoulder 164 in the sleeve member 144, whereupon the spring 216 will be fully compressed. The combined plug member 254 and canopy breaker 232 are driven upwardly by the gases, such members remaining connected by their joining O-ring 264 until the top of the base portion 268 on the plug member seats against the lower end 272 of the lock element. When this occurs, further upward movement of the plug member will be prevented, but the O-ring 264 shears so that the canopy breaker 232 can continue upwardly to shatter the canopy, designated C in FIG. 8. Since the cylindrical or intermediate portion 266 of the plug member completely fills the bore 248 in the lock element 208, the catapult gases are prevented from escaping and hence as these gases rapidly expand, they cause the inner and outer catapult tubes to untelescope. More specifically, as shown in FIG. 8, the catapult gases continue to react against the plug element and against all exposed surfaces at the bottom of the sleeve member 144 for driving the outer catapult tube upwardly, and hence, for ejecting the seat 22 upwardly through the canopy which, at this point, has been shattered by the canopy breakers 232. In the event that the canopy is fabricated of a plastic material which would not completely shatter due to the two holes being formed therein by the pair of canopy breakers 232, it is possible to provide a beam which bridges between the two spaced canopy breakers so that the breakers and beam together would contact the canopy to shatter the same. In this manner, it will be understood that a firing of the catapults serves to (1) unlock the inner and outer catapult tubes from one another, (2) drive the canopy breakers upward through the canopy to shatter the same, and (3) eject the seat upwardly out of the aircraft with the outer catapult tubes remaining attached to the seat back while the inner catapult tubes and the header remain fixed within the aircraft. The ejection rails guide the seat along its egress path to the point of separation of the ejected mass from the aircraft.

After reading the foregoing detailed description, it will be apparent that the objects set forth at the outset of the specification have been successfully achieved by the present invention. However, since the foregoing detailed description is only directed to a preferred embodiment of the present invention, various changes which are apparent to those skilled in the art may be made without departing from the spirit and scope of the invention as defined in the appended claims.

We claim:

1. In an ejection seat assembly, the improvement for enabling the position of the seat to be adjusted prior to ejection, said improvement comprising:
catapult means coupled with said seat and being operable to eject said seat from an aircraft in which said seat is installed;
said catapult means having at least two relatively movable members whose movement defines the stroke of said catapult means, said members moving relatively to one another and through said stroke when said catapult means is operated;
enclosure means forming a chamber surrounding a selected portion of said catapult means;
said enclosure means being attached to said seat;
controllable fluid circuit means for controlling flow of pressurized fluid to and from said chamber to thus selectively move said enclosure means and said seat attached therewith until said seat reaches an adjusted position; and
said members retaining their relative positions with respect to each other as pressurized fluid flows to and from said chamber to assure that adjustment of said seat will not vary the stroke of said catapult means.

2. The improvement defined in claim 1 wherein said relatively movable members comprise a pair of elongated telescoping members, one of which stays attached to said seat as said seat is ejected and the other of which stays attached to said aircraft as said seat is ejected, said selected portion being provided on said one member.

3. The improvement defined in claim 1 wherein said selected portion defines a piston and wherein said chamber defines a cylinder, said piston and cylinder being movable relative to one another by controlled flow of said pressurized fluid in said cylinder.

4. The improvement defined in claim 3 wherein said fluid circuit means includes a flow connection means communicating with said cylinder on both sides of said piston and wherein a sealing engagement is provided between said piston and cylinder to prevent fluid on one side of said piston from communicating with fluid on the other side thereof except through said fluid circuit means.

5. In an ejection seat assembly, the improvement for enabling the position of the seat to be adjusted prior to ejection, said improvement comprising:
catapult means coupled with said seat and being operable to eject said seat from an aircraft in which said seat is installed;
enclosure means forming a chamber surrounding a selected portion of said catapult means;
said enclosure means being attached to said seat;
controllable fluid circuit means for controlling flow of pressurized fluid to and from said chamber to thus selectively move said enclosure means and said seat attached therewith until said seat reaches an adjusted position;
said catapult means including a pair of elongated telescoping members, one of which stays attached to said seat as said seat is ejected and the other of which stays attached to said aircraft as said seat is ejected, said selected portion being provided on said one member, said selected portion defining a piston and wherein said chamber defines a cylinder, said piston and cylinder being movable relative to one another by controlled flow of said pressurized fluid in said cylinder;
said fluid circuit means including a flow connection means communicating with said cylinder on both sides of said piston;
a sealing engagement being provided between said piston and cylinder to prevent fluid on one side of said piston from communicating with fluid on the other side thereof except through said fluid circuit means; and
downward acceleration limiting means comprising fluid bypass conduit means communicating with said cylinder on both sides of said piston and pressure-releasable, flow-blocking means in said bypass conduit means, said flow-blocking means normally closing said bypass conduit means but being openable in response to an increase in the pressure of said fluid created by downward acceleration.

6. The improvement defined in claim 5 wherein said pressure-releasable, flow-blocking means comprises a pressure relief valve means having variable orifice means therein whose size increases as said fluid pressure increases.

7. In the combination of an aircraft having a cockpit covered by a frangible canopy and an ejection seat installed in said cockpit and being selectively ejectable therefrom, the improvement for breaking said canopy as ejection of said seat commences which comprises:
catapult means coupled with said seat and being operable to eject said seat from said cockpit;
canopy breaker means releasably retained with said catapult means to be ejected from the upper end thereof in juxtaposition to said canopy; and
catapult-firing means for operating said catapult means and for ejecting said canopy breaker means from the catapult means upward to break said canopy; said canopy breaker means being released from said catapult means and said canopy being broken thereby prior to the time when the uppermost portion of said seat reaches said canopy.

8. The improvement defined in claim 7 wherein said catapult means includes internal flow passage means through which gas pressures generated by said catapult-firing means are transmitted and wherein said canopy breaker means includes at least a portion communicating with said flow passage means so said gas pressures will act upon said portion to propel said canopy breaker means upward.

9. The improvement defined in claim 7 wherein said catapult means includes a pair of telescoping tubes, one of which is attached to said seat and the other of which is attached to said aircraft and remains therein after said seat and said one tube are ejected, and wherein said canopy breaker means is releasably coupled with said seat-attached tube.

10. The improvement defined in claim 9 wherein said seat-attached means has an internal bore open at its upper end and wherein said canopy breaker means includes a shank portion normally positioned in said internal bore, said catapult-firing means generating gas pressure which is transmitted through said internal bore to apply pressure to said shank portion for propelling said canopy breaker means upward, thereby withdrawing said shank portion from said internal bore.

11. The improvement defined in claim 10 further including a plug member releasably attached to said breaker means shank portion and cooperating means within said internal bore whereby when said gas pressure propels said canopy breaker means upward, said plug member abuts against said cooperating means and thus closes said internal bore to retain gas pressure therewithin while said canopy breaker means separates from said plug member and continues upwardly.

12. The improvement defined in claim 9 further including releasable-locking means between said telescoping tubes, said locking means normally locking said tubes together to prevent telescoping movement therebetween, said locking means being releasable responsively to operation of said catapult-firing means to permit said tubes to untelescope as said seat ejects.

13. The improvement defined in claim 7 wherein:
said catapult means includes a first elongated hollow tube operatively attached to said aircraft and a second elongated hollow tube operatively attached to said seat, said first and second tubes being telescopically assembled with each other;
said catapult-firing means includes an explosive charge which, when detonated, generates high-pressure gases which are transmitted through at least one said telescoped tubes; and
said canopy breaker means includes an enlarged breaker head and a depending shank portion, said shank portion being releasably disposed within said second hollow tube and being propelled therefrom by said high-pressure gases.

14. The improvement defined in claim 13 wherein:
said first tube includes an enlarged piston portion at the upper end thereof slidably engageable with said second tube;
said piston portion including a section forming part of a releasable-locking means and said second tube including a section adjacent its upper end which forms another part of said releasable-locking means;
one of said sections having a locking groove therein and the other of said sections having a movable detent means therein engageable within said locking groove to lock said tubes together;
a slidable lock member movably mounted with respect to at least one of said tubes and biasing means normally urging said lock member to a locking position whereat it engages said detent means in said locking groove; and
said lock member having at least a portion which is contacted by said high-pressure gases when said catapult-firing means is actuated, said gases overcoming said biasing means to urge said lock member to an unlocked position whereat it releases said detent means to permit said detent means to disengage from said locking groove, thereby unlocking said tubes.

15. The improvement defined in claim 14 wherein said second tube section is a sleeve member containing said locking groove, wherein said piston portion section is an annular rib having a series of apertures therein, wherein said detent means are locking balls engageable between said apertures and said locking groove and wherein said lock member is slidably mounted within said sleeve member.

16. The improvement defined in claim 14 wherein said lock member has a central bore and wherein said shank portion of said canopy breaker means is slidably disposed within said central bore.

17. The improvement defined in claim 16 further including a plug member having a body portion coextensive with said shank portion of said canopy breaker means and joined thereto by releasable coupling means whereby, as said gases propel said canopy breaker means upward to withdraw said shank portion from said central bore, said plug member body portion will enter said central bore to seal the same, thereby preventing said gases from escaping.

18. The improvement defined in claim 17 wherein said sleeve member includes a shoulder portion against which said gases seat the upper end of said lock member and wherein said plug member includes an enlarged portion which seats against the lower end of said lock member when said body portion is fully positioned in said central bore, said releasable coupling means being shearable when said enlarged portion seats against said lock member lower end to thereby disconnect said canopy breaker means from said plug member.

19. An ejection seat comprising:
a seat movably mounted in an aircraft;
catapult means including at least a pair of telescoping tubes, one of which is attached to said seat and one of which is attached to said aircraft;
gas pressure generating means for creating high gas pressures within said pair of telescoping tubes to eject said seat from said aircraft;
said seat-attached tube including an enlarged peripheral portion forming a piston;
enclosure means attached to said seat and surrounding a portion of said seat-attached tube to form a cylinder within which said piston is disposed;
flow circuit means including flow connections to said cylinder on opposite sides of said piston, and hydraulic fluid in said flow circuit means to effect relative movement between said cylinder and piston;
said flow circuit means also including control means and said piston, cylinder and flow circuit means thus creating a seat adjustment mechanism which varies the position of said seat in response to operation of said control means;

canopy breaker means releasably mounted at the upper end of said seat-attached tube; and said canopy breaker means being released from said tube and propelled upward in response to said high gas pressures to thereby break a canopy normally spaced above said seat.